United States Patent Office 3,417,113
Patented Dec. 17, 1968

3,417,113
CERTAIN MONOARYLLEAD TRISACYLATES AND A PROCESS FOR PREPARING THEM
Henricus G. J. Overmars, Zeist, Netherlands, assignor, by mesne assignments, to International Lead Zinc Research Organization, Inc., New York, N.Y., a corporation of New York
No Drawing. Filed Feb. 23, 1965, Ser. No. 434,670
Claims priority, application Netherlands, Mar. 2, 1964, 6402097
16 Claims. (Cl. 260—408)

ABSTRACT OF THE DISCLOSURE

The present application discloses monoaryllead trisacylates in which at least one of the acyl radicals is halogen substituted with a halogen of the group consisting of chlorine and bromine. It also discloses a process for making such compounds by reacting an alkylplumbonic acid with a monohalogen substituted alkylmonocarboxylic acid in a common solvent with heat. The application also discloses a process for making thermostable polyurethane foams by the reaction of at least one polyfunctional isocyanate, and at least one polyhydroxy compound in cooperation with a blowing agent, by using as a catalyst one of the halogenated monoaryllead trisacylates as disclosed herein.

---

This invention relates to novel organolead compounds in which the lead has a valance of 4, and to methods of making same. It also relates to the manufacture of polyurethane foams by the use of said compounds as catalysts, and to the foams so produced.

In brief, my novel compounds may be broadly characterized as the phenyllead trisacylates in which at least one of the acyl radicals is halogen-substituted. Or equally, they may be characterized as the fatty acid salts of monoarylplumbonic acid with at least one halogen substitution for a hydrogen atom in at least one of the fatty acid radicals.

My invention will be best understood from the following detailed description which includes examples of the new organolead compounds and their manufacture, and of the methods of using them as catalysts in the manufacture of polyurethane foams.

Examples I and II which follow directly, relate to methods of making my novel lead compounds.

EXAMPLE I 160 grams of phenylplumbonic acid, PhPbOOH, was stirred together with 140 g. of monochloracetic acid in five litres of dry benzene while heating mildly (below 40° C.) until a clear solution was formed. The benzene was removed in vacuo at about 30° C. A light yellow oil having a refractory index of 1.5958 at 20.0° C. was left. The product was phenyllead tris(monochloracetate).

The yield was substantially equal to the theoretical yield. The product showed the following analysis:

Pb content as found 35.61%; calculated: 36.76%
Cl content as found 17.84%; calculated: 18.65%.

The above reaction may be represented by the equation:

(1) PhPbOOH+3ClCH₂COOH→
    PhPb(OCO—CH₂—Cl)₃+2H₂O

This reaction has a broad application, and may be used whenever it is desired to form a corresponding compound of any halogenated acyl compound. For example, starting with monochloroleic acid,

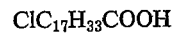

phenyllead tris(monochlorooleate) may be obtained.

EXAMPLE II 480 grams of phenylleadtriacetate 1 aq. in 10 litres of dry benzene were reduced to half their volume by evaporation, thereby dissolving the phenylleadtriacetate by removing by evaporation the mole of water of crystallization, whereupon 153 g. of alpha-bromopropionic acid was added to the clear solution obtained; the clear solution was evaporated to dryness in vacuo at about 30° C. A light yellow oil having a refractory index of 1.5855 at 20.0° C. was left. The product was phenylleadacetatebis (alpha-bromopropionate).

The yield was substantially equal to the theoretical. The product showed the following analysis:

Pb content as found: 31.71%; calculated: 31.99%
Br content as found: 21.66%; calculated: 25.20%.

The reaction involved may be represented by the following equation:

(2) PhPb(OCO—CH₃)₃+2CH₃—CHBr—COOH→
    PHPb(OCOCH₃)(OCOCHBrCH₃)₂+2CH₃—COOH

The same type of reaction as (1) was used to make the following additional compounds:

|  | Percent Pb | | Percent halogen | | |
|---|---|---|---|---|---|
|  | Found | Calculated | Found | Calculated | $n_D^{20}$ |
| Phenylleadtris (alpha-bromopropionate) | 25.06 | 27.97 | 31.20 | 32.43 | 1.5815 |
| Phenylleadtris (beta-chloropropionate) | 33.00 | 34.14 | 18.17 | 17.53 | 1.5825 |
| Phenylleadtris (gamma-chlorobutyrate) | 31.14 | 31.93 | 14.78 | 16.39 | 1.5638 |
| Phenylleadtris (omega-bromoundecylate) | 18.65 | 19.24 | 21.19 | 22.36 | 1.5350 |
| Paratolylleadtris (beta-chloropropionate) | 32.10 | 33.36 | 17.54 | 17.15 | 1.5734 |
| Betanaphthylleadtris (beta-chloropropionate) | 29.28 | 31.73 | 15.63 | 16.17 | 1.6068 |

The same type of reaction as (2) was used to make the following compound:

| | | | | | |
|---|---|---|---|---|---|
| Phenyllead (diacetate) (alpha-bromopropionate) | 35.92 | 37.36 | 14.97 | 14.44 | 1.5878 |

The above and similar compounds may be prepared by other reactions, as for example the following:

(3) Ph₂Pb(OCOCH₂Cl)₂+Hg(OAc)₂→
    PhPb(OCOCH₂Cl)₂OAc+PhHgOAc although this reaction may also proceed:

(3′) Ph₂Pb(OCOCH₂Cl)₂+Hg(OAc)₂→
    PhPb(OCOCH₂Cl)(OAc)₂+PhHg(OCOCH₂Cl)

(4) Pb(OCOCH₂Cl)₄+Ph₂Hg→
    PhPb(OCOCH₂Cl)₃+PhHgOCOCH₂Cl (5)

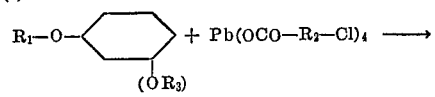

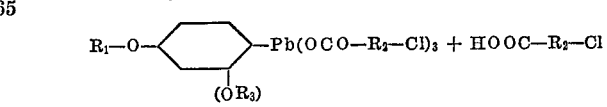

where R₁, R₂, and R₃ represent alkyl groups.

Further, the non-halogenated compound may first be made as by reactions (1) and (2), and the halogen atoms then introduced to one or more of the acid radicals.

I have discovered that surprisingly, these novel organolead compounds offer the solution to a number of problems with respect to the production and the properties of polyurethane foams.

Polyurethane foam is obtained by reacting polyfunctional isocyanates with polyhydroxy compounds in the presence of a blowing agent. This blowing agent can be a low-boiling liquid such as one of the freons, lower hydrocarbons, or esters and the like, i.e., the so-called physical blowing agents; and preferably it can also be carbon dioxide, created in situ by the reaction of water with a small part of the polyfunctional isocyanate.

Organometal compounds, as for example, tin dioctoate, are commonly used as catalysts promoting gelation, i.e., the reaction between isocyanate and polyhydroxy compounds. A drawback of a compound of this type is that it is unstable, thereby requiring the use of stabilizers which have drawbacks of their own. Basic metal compounds such as metal carbonates, carboxylates and the like frequently give rise to a hydrolytic degradation of the final product. The well-known cobalt naphthenate gives rise to discoloration, and also requires the additional use of a hydrocarbon solvent, because by itself, it does not readily dissolve in the reaction mixture. It is true that strong bases are extremely active, but for the production of foam they are useless, because it is impossible to control the gelation. Ferric acetylacetonate is effective, but gives rise to discoloration and to an oxidative degradation of the final product.

However, the novel organolead catalysts promote both the reaction already mentioned of gelation, and of $CO_2$ production, both in the proper sequence. Heretofore, it has been thought that if both reactions were to be carried out at all, it would be necessary to employ separate catalysts for the two reactions, as for example, certain organometal compounds for the isocyanate-polyhydroxy reaction (gelation) and tertiary amines for the isocyanate-water reaction.

In practice, however, it is found that the two catalysts interfere with each other, whereby the use of such an overall process has been extremely limited.

A great disadvantage of tertiary amines is that, as a result of their volatility, they lend an unpleasant odor to the final product. In addition, they give rise to undesired reactions in the final product which are responsible for discoloration and a deterioration of the mechanical properties. They generally require high reaction temperatures and are not very active, even to the point of being practically unfit for use in reactions with aliphatic isocyanates. There is thus a need for a single catalyst which will not only bring about a satisfactory isocyanate-polyhydroxy reaction, but also a satisfactory isocyanate-water reaction, and in such a way so as to have each of these reactions catalyzed at the right time and in the right manner. A catalyst which would strongly catalyze the $CO_2$ formation before the formation of polyurethanes was well on its way, is no more satisfactory than a catalyst which would have substantially completed the polyurethane formation before the formation of $CO_2$ gets started. Moreover, there should intervene a certain lapse of time between the mixing of the components and the beginning of foaming, thus facilitating the use of the usual spray nozzles, and with the overall result of a fine and regular foam structure.

Thus a known catalyst, tin dioctoate, is found to be much too slow in catalyzing the $CO_2$ formation, whereas, another known catalyst, triethylenediamine is found to be much too slow in catalyzing the gelation reaction. Nor is it possible to render these catalysts suitable for the two-fold purpose by changing the concentrations used. It is indeed possible to slow down the formation of $CO_2$ with triethylenediamine by using a lesser concentration of catalyst, but this is of no avail because in that case gelation is retarded even more. If the concentration of tin dioctoate is increased, the formation of $CO_2$ is accelerated, but so is the gelation to a much higher degree.

A method for testing the effect of catalysts on gelation is the following:

5 grams of a branched polyether (polyoxypropyleneglycol having a KOH index of 55 and a molecular weight of about 3000) is mixed with 50 mg. of the substance to be tested. Subsequently, 0.4 cc. of toluenediisocyanate (80% 2–4 derivative and 20% 2–6 derivative) is admixed thoroughly at 20° C. The time is measured in minutes elapsing until the mixture has gelated.

Known compounds such as diphenyllead dilaurate, dibutyllead dilaurate, diethyllead maleinate, tributyllead laurate, triphenyllead acetate, tetraphenyllead, and hexaphenyllead appeared in this test to show gelation times of more than 450 minutes, which is much too long.

The new organolead compounds according to this invention show short gelation times, on the order of a few minutes to about one half hour. This is likewise true even though different hydroxy compounds, different mixing ratios, and different isocyanates are used, and whether the process be carried out in the laboratory or on a commercial scale.

A blank test, i.e., without any catalyst, showed a gelation time far too great to be practicable.

The following method for testing the effect of catalysts on the formation of $CO_2$ in situ, is given:

80 mg. of the substance to be tested is mixed with 4 cc. of tetrahydrofuran and 4 cc. of dimethylcellosolve in which 228 mg. of water has been dissolved in a flask filled with carbon dioxide gas. The flask is connected to a gas burette and 2 cc. of toluenediisocyanate (80% 2–4 and 20% 2–6 derivative are added by means of an injection needle while stirring, all of this at 30° C. The time in seconds necessary for the formation of 100 cc. of $CO_2$ is then measured.

Compounds such as diphenyllead dilaurate, tributyllead actate, tetrabutyllead, as well as tin dioctoate, appear to catalyze the $CO_2$ formation much too slowly (times on the order of 200–600 seconds in the above-quoted test), whereas with the novel organolead compounds according to the invention, the times are on the order of 14–15 seconds. A blank test yielded less than 100 cc. of $CO_2$ after 600 seconds.

Further, the catalysts according to the invention are found to be sufficiently effective even at concentrations lower than, for instance, 1% calculated on the weight of the reaction components. This is in contrast to many known catalysts which rapidly become ineffective as the concentration decreases. The amount of catalyst to be used in order to obtain a good foam can easily be established by a practical test. This is dependent both on the manner and on the mechanical device with which the foam is produced. Quantities on the order of from 0.05 to 5 percent by weight have been found useful; higher concentrations can be used if more rapid foam formation is sought, whereas lower concentrations can be used if a slower rate is permissible, a foam of good structure and good mechanical properties being had in either case. The control of foam flexibility may be had by the choice of the reaction components.

Besides toluenediisocyanate, other aliphatic or aromatic isocyanates are highly suitable for use in the present process, such as polymethylenepolyphenylisocyanate, diphenyl methanediisocyanate and the like, as are mixtures of other known isocyanates. The same is true of the polyhydroxy compounds.

In the formation of foam according to my invention, other known substances functioning as stabilizers, combustibility and/or inflammability retardants, filling agents, pigments, dyes, silicone oil, etc., also other catalysts may be used if desired.

While permitting the same degree of control of conditions as obtained in the prior art, my improved process is further characterized by the fact that other things being equal, a somewhat longer time is required for the reactions to go to completion. This is to be regarded as an advantage since less risk of premature gelation and foaming up will be had.

The apparent specific weight (kilogram per cubic meter of foam) can be controlled within wide limits by a suitable choice of the concentrations, inter alia of water. It is very simple to attain apparent specific weights between 0.01 or lower, and 0.06 and higher. Another advantage of the catalysts according to the invention is that, as already stated, they readily dissolve in the polyhydroxy compounds used for the preparation of polyurethanes especially in the widely used polyethers. Very useful polyhydroxy compounds are those polyethers which contain hydroxyl groups, such as polyethylene glycols and polypropylene glycols with a molecular weight ranging from about 400 to about 2000, and products obtained by additon reactions of polyalkylene oxides (such as polypropylene oxide) with triols such as glycerol or trimethylol methane. These and other useful ingredients for the production of polyurethane foams are described by Bernard A. Dombrew in his book "Polyurethanes," New York.

The preparation of polyurethane foam with the novel organolead compounds will now be illustrated in the following examples:

EXAMPLE III 100 grams of a polyoxypropylenetriol (molecular weight 2000) was mixed with 1% of silicone oil and 0.4% by weight of phenylleadtris (omegabromoundecylate), while stirring constantly. After some time, 4 grams of water was added and subsequently, at a quick rate, 44 grams of a mixture of 2.4 and 2.6 toluenediisocyanate in a ratio of 80 to 20. After 10 more seconds of stirring without external heat being applied, the mixture was poured out into a paper cylinder in which some 40 seconds later, a very rapid foaming took place. This gave rise to a polyurethane foam of regular structure and an apparent specific weight of 0.027.

The swelling in benzene amounted to 33%, and in acetone to 25%.

EXAMPLE IV

Example III was repeated, but this time with 0.3% by weight of phenyllead tris(betachloropropionate). The foam obtained had an apparent specific weight of 0.036.

EXAMPLE V

Example III was repeated, but this time with 0.3% of paratolyllead tris(betachloropropionate). This foam obtained had an apparent specific weight of 0.035.

EXAMPLE VI

Example III was repeated, but this time with 0.3% of betanaphthyllead tris(betachoropropionate). The foam obtained had an apparent specific weight of 0.037.

In additon to the advantages already stated for the new compounds in the manufacture of polyurethane foams, a still further advantage of great importance remains to be stated. As of now, polyurethane foams suffer from the drawback that they deteriorate with age, particularly when stored. A test for this is the so-called accelerated aging test which consists in heating the foam in the air to a comparatively high temperature, whereupon disintegration takes place. To make the test quantitative, the disintegrated foam is extracted with a suitable solvent, e.g., methylethylketone, the extract concentrated to dryness by evaporation, and the residue weighed. The greater the amount by weight of the residue, the greater the disintegration that is produced. Present attempts are made to slow the aging process by the use of so-called stabilizers, of which catechol, butyl catechol, tartic acid, are examples. The use of these substances, however, gives rise to certain drawbacks, as for example: tartaric acid slows the foam reaction, and impairs the foam structure; catechols produce undesirable odors and discolorations, particularly since they exude from the finished foam, and are subject to evaporation.

I have now discovered that my improved catalysts likewise function as stabilizers to the end that the use of extraneous compounds for the purpose of stabilization is no longer required. Attention is drawn to the following examples which illustrate the stabilizing effect of the new compounds.

EXAMPLE VII

Examples III and IV were repeated but with a non-halogenated catalyst viz., phenyleadtriacetate. The above aging test was then run on the products obtained, i.e., the fresh foam was heated to 140° C. for 5 hours and methylethylketone extracted. The results were as follows:

| Catalyst | Residue of the extract in percent | |
|---|---|---|
|  | Before heating | After heating |
| Phenyllead tris(beta-chloropropionate) | 0.7 | 0.9 |
| Phenyllead tris(omega-bromoundecylate) | 2.1 | 2.5 |
| Phenylleadtriacetate | 4.8 | 26.9 |
| Paratolyllead tris(betachloropropionate) | 1.3 | 1.6 |
| Betanaphthyllead tris(betachloropropionate) | 1.1 | 1.7 |

To recapitulate, my new compounds thus perform three functions for which until now three different compounds had to be used, i.e., a catalyst for the gelation reaction, another catalyst for the isocyanate-water reaction cooperating with the gelation reaction, and another compound as a stabilizer against aging.

Of course, if for some reason it is found desirable, physical blowing agents may be used in lieu of self-generated $CO_2$, although in our experience the best results are obtained in accordance with the methods herein set forth, wherein no other catalyst is used, and the blowing agent is self-generated $CO_2$.

While compounds of the invention having three different acyl groups attached to the lead atom may be used, with at least one of such groups halogenated, thus far we have found it easiest to have at least two of such radicals the same.

While a complete explanation of the action of the new catalysts remains to be discovered, so far it appears that the mobility of the halogen atom is a factor; thus if all the halogen atoms are attached to the phenyl nucleus where they are more firmly bound, the beneficial effect is not had.

It will be understood that in the light of the foregoing disclosure, other and analogous compounds will suggest themselves to those skilled in the art, which will be within the spirit of my invention.

In the claims, the term "halogen" is to be restricted to include chlorine and bromine only.

I claim:
1. As new compositions of matter the compounds represented by the formula:

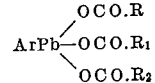

in which Ar is an aromatic hydrocarbon group of the class consisting of monocarbocyclic aryl and dicarbocyclic aryl and R, $R_1$ and $R_2$ each represents an alkyl radical having 2 to 18 carbon atoms, at least one of which is monosubstituted by chlorine or bromine.

2. As new compositions of matter, arylleadtrisalkylcarboxylates in which at least one of the alkylcarboxylate radicals is monosubstituted with chlorine or bromine, and in which the aryl radical is chosen from the group: phenyl, tolyl or naphthyl and in which the alkyl group of said alkyl carboxylate radical contains 2 to 18 carbon atoms.

3. As new compositions of matter the compounds represented by the formula:

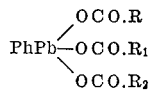

in which Ph is phenyl, R, $R_1$ and $R_2$ each represents an alkyl radical having 2 to 18 carbon atoms, R and $R_1$ being alike and halogen-substituted with chlorine or bromine.

4. As new compositions of matter the compounds represented by the formula:

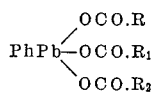

in which Ph is phenyl, R, $R_1$ and $R_2$ each represents an alkyl radical having 2 to 18 carbon atoms, R, $R_1$, and $R_2$ being alike and halogen-substituted with chlorine or bromine.

5. As new compositions of matter the compounds represented by the formula:

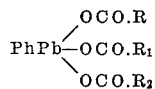

in which Ph is phenyl, R, $R_1$, $R_2$ each represents an alkyl radical having 2 to 18 carbon atoms, R and $R_1$ being alike and $R_2$ being halogen-substituted with chlorine or bromine.

6. Phenyllead tris(beta-chloropropionate).
7. Phenyllead tris(omega-bromoundecylate).
8. Phenyllead tris(monochloroacetate).
9. Phenylleadacetate bis(alpha-bromopropionate).
10. Phenyllead tris(alpha-bromopropionate).
11. Phenyllead tris(gamma-chlorobutyrate).
12. Phenyllead(diacetate) (alpha-bromopropionate).
13. Paratolyllead tris(beta-chloropropionate).
14. Betanaphthyllead tris(beta-chloropropionate).
15. The process of making a compound having the formula:

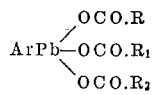

in which Ar is a hydrocarbon group of the class consisting of monocarbocyclic aryl and dicarbocyclic aryl, R, $R_1$ and $R_2$ each represent an alkyl radical having 2 to 18 carbon atoms which is monosubstituted with chlorine or bromine, which consists in reacting the corresponding arylplumbonic acid with an alkylmonocarboxylic acid, said alkyl radicals having 2 to 18 carbon atoms and at least one of said alkyl radicals being monosubstituted with chlorine or bromine, in a common solvent with heat until a clear solution is obtained.

16. The process according to claim 15 in which the aryl radical is chosen from the group: phenyl, tolyl, naphthyl.

References Cited

UNITED STATES PATENTS 2,985,673  5/1961  Convery _____ 260—414

NICHOLAS S. RIZZO, *Primary Examiner.*

R. J. GALLAGHER, *Assistant Examiner.*

U.S. Cl. X.R.

260—2.5, 433, 435, 436, 437